United States Patent [19]

Germain

[11] 4,152,093
[45] May 1, 1979

[54] TANK AND A MOTORIZED COMPRESSOR
[75] Inventor: Roger L. E. Germain, Maisons Lafitte, France
[73] Assignee: Societe Nationale d'Etude et de Construction de Moteurs d'Aviation
[21] Appl. No.: 818,658
[22] Filed: Jul. 25, 1977
[30] Foreign Application Priority Data
Jul. 29, 1976 [FR] France .............................. 76 23644
[51] Int. Cl.² ............................................. F04D 31/00
[52] U.S. Cl. .................................... 415/116; 55/158; 415/199.4
[58] Field of Search ........................... 55/16, 158, 163; 415/143, 77, 79, 182, 219 R, 116, 144, 211, 198.1, 199.4, 215; 417/250

[56] References Cited
U.S. PATENT DOCUMENTS

| 890,537 | 6/1908 | Stanley | 55/463 |
| 1,976,629 | 10/1934 | Parkinson | 55/17 |
| 2,557,131 | 6/1951 | Miller | 415/143 |
| 3,246,449 | 4/1966 | Stern et al. | 55/158 |
| 3,792,570 | 2/1974 | Biondi et al. | 55/16 |

Primary Examiner—Bernard Nozick
Attorney, Agent, or Firm—Cameron, Kerkam, Sutton, Stowell & Stowell

[57] ABSTRACT

Tank for a motorized compressor, more particularly for an installation for the isotopic separation by gaseous diffusion, which has a generally cylindrical shape and a vertical axis containing a motorized compressor with an axial intake for a low pressure gas flow, a lateral intake for a medium pressure flow to be mixed in the motorized compressor with the low pressure flow and a diffuser for forcing back the high pressure flow at the outlet from said motorized compressor, whereby said tank has a first lateral opening for the entry of the medium pressure flow and a second lateral opening for the discharge of the high pressure flow, wherein for ensuring separation of the medium pressure flow before entering the motorized compressor and the high pressure flow at the outlet from said motorized compressor, it comprises a truncated cone-shaped skirt whose large base is inclined relative to the tank axis, said skirt being fixed to the tank along a continuous line passing on the one hand below the first opening for the entry of the medium pressure flow and on the other hand above the second opening for the discharge of the high pressure flow.

5 Claims, 3 Drawing Figures

4,152,093

TANK AND A MOTORIZED COMPRESSOR

BACKGROUND OF THE INVENTION

The present invention relates to a tank for a motorised compressor (moto-compressor), more particularly for an installation for isotopic separation by gaseous diffusion.

It is known that such installations in general have a cascade of units or separation stages, each constituted by a generally cylindrical column positioned vertically and supported by a horizontal supporting plate. From bottom to top each column has a separation chamber, a heat exchanger and a double flow axial motorised compressor. The gas to be treated arriving at high pressure from the motorised compressor of the upstream stage is separated in the separating chamber into a medium pressure flow and a low pressure flow on either side of porous barriers, the difference in these pressures being due to the pressure drop on passing through the same. The medium pressure flow is then taken up by a by-pass pipe and is returned to the upstream stage, whilst the low pressure flow is directed towards the motorised compressor located at the base of the column and in which it is mixed with the medium pressure flow from the downstream stage. The two flows are forced back under high pressure towards the following stage and so on throughout the entire cascade. In each stage the heat exchanger positioned between the separating chamber and the motorised compressor is traversed by the low pressure flow which enters the latter and by the high pressure flow at the outlet of said motorised compressor, so that the former recovers the calories acquired by the latter during its compression.

According to one construction of this type, the motorised compressor is advantageously suspended at the base of the column in each stage which permits an easy disassembly thereof. Moreover, the use of an axial motorised compressor makes it possible to ensure a direct intake of the low pressure flow at the outlet from the exchanger in the compressor rotor which reduces pressure drops and the danger of leaks. However, in this solution the intake of medium pressure flow to be recycled in the motorised compressor and which comes from the downstream stage makes it necessary to have a pipe connected laterally to the tank forming the lower part of the column, said pipe being positioned above the pipe via which is forced back the mixed flow at high pressure on leaving the motorised compressor. As a result the latter must have a relatively large size and the tank dimensions are considerably increased.

To obviate this disadvantage, it has already been proposed that the intake pipe for the medium pressure flow to be recycled be arranged in such a way that it traverses the diffuser provided inside the tank for collecting the high pressure flow when it leaves the rotor of the motorised compressor. However, in this case other problems occur, particularly due to the differential expansion rates between the members contained in the tank and in particular between the medium pressure flow supply pipe and the diffuser receiving the high pressure flow because said two flows are at different temperatures.

BRIEF SUMMARY OF THE INVENTION

The present invention relates to an improvement of the layout of the tank of a motorised compressor used in an installation of the type indicated hereinbefore which makes it possible particularly through a suitable arrangement of partitions to permit the advantageous fitting into one another of the regions provided for the medium pressure flow intake on the one hand and for forcing back the high pressure flow on the other. This leads to an improvement in the operating conditions and in particular brings about a reduced size of the motorised compressor and an optimum development of the aerodynamic sections of the spaces via which are distributed the intake and discharge flows within the compressor. As a result of the arrangements provided according to the invention better access is possible to the inside of the tank and the components contained therein, permitting in particular the cleaning or protective treatment of the surfaces of said components, as well as their assembly or disassembly for repair and maintenance.

The invention relates to a tank which has a generally cylindrical shape and a vertical axis containing a motorised compressor with an axial intake for a low pressure gas flow, a lateral intake for a medium pressure flow to be mixed in the motorised compressor with the low pressure flow and a diffuser for forcing back the high pressure flow at the outlet from said motorised compressor, whereby said tank has a first lateral opening for the entry of the medium pressure flow and a second lateral opening for the discharge of the high pressure flow, wherein for ensuring separation of the medium pressure flow before entering the motorised compressor and the high pressure flow at the outlet from said motorised compressor, it comprises a truncated cone-shaped skirt whose large base is inclined relative to the tank axis, said skirt being fixed to the tank along a continuous line passing on the one hand below the first opening for the entry of the medium pressure flow and on the other hand above the second opening for the discharge of the high pressure flow.

The internal truncated cone-shaped skirt fitted within the tank thus makes it possible to separate in a tightly sealed and total manner the medium pressure flow on entering the motorised compressor, and the high pressure flow forced back at the outlet thereof, the volumes defined on either side of said skirt having an increasing cross-section towards the discharge opening of the high pressure flow and a decreasing cross-section starting from the intake opening of the medium pressure flow.

BRIEF DESCRIPTION OF THE DRAWINGS

Other characteristics of a motorised compressor tank according to the invention can be gathered from the following description of exemplified non-limitative embodiments with reference to the attached drawings, wherein show.

DETAILED DESCRIPTION OF THE PREFERRED EMBODIMENTS

Figure 1:
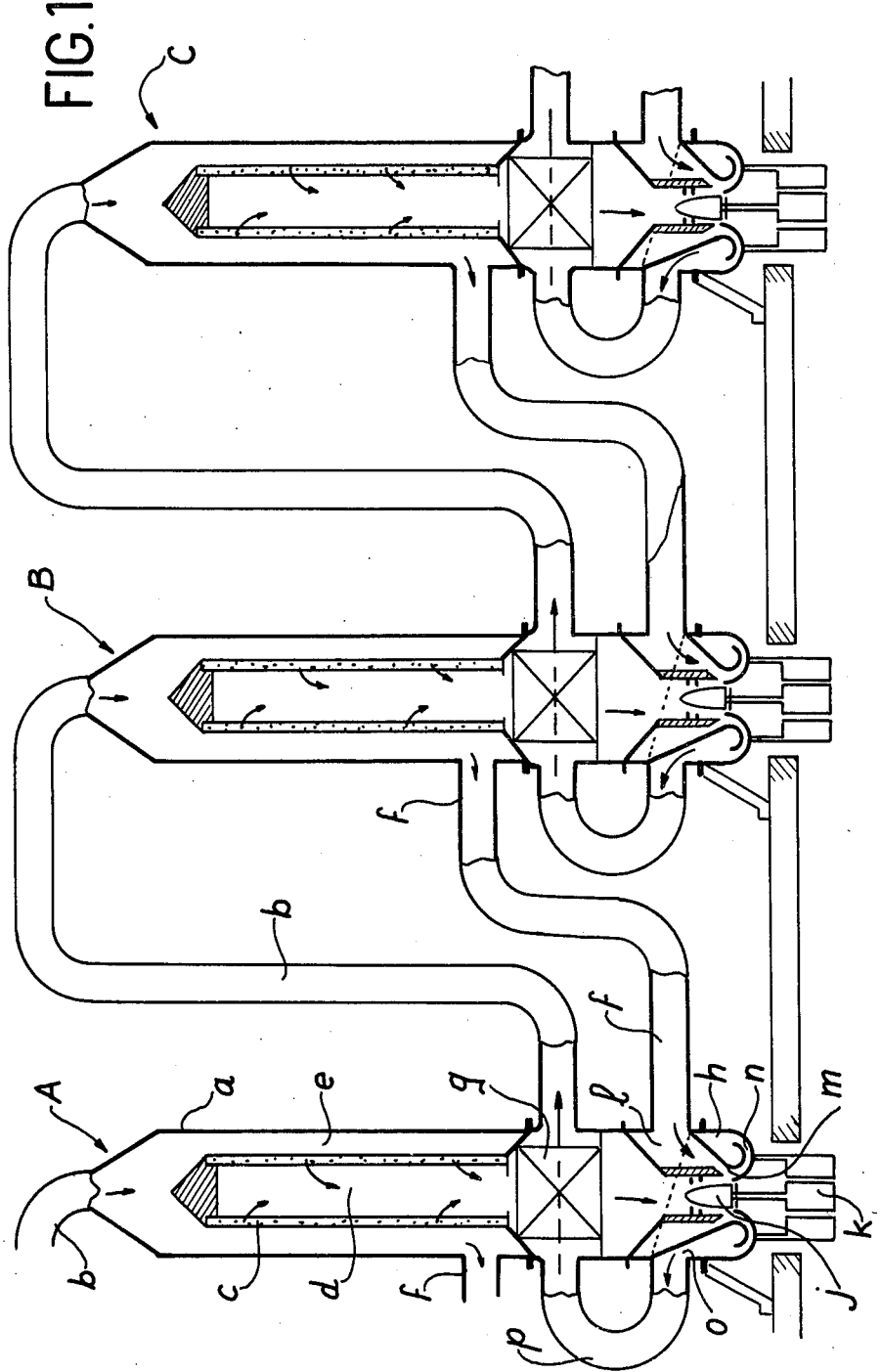
FIG. 1, diagrammatically a cascade of isotopic separation units or separation stages, each having a tank surrounding a motorised compressor according to the invention.

The installation for isotopic separation by gaseous diffusion shown schematically in FIG. 1 comprises a plurality of stages in series, whereof only three, designated by the reference letters A, B and C are shown in the drawing. Each of the three stages is identical and each has a vertical cylindrical column a supplied with the gas to be treated, particularly uranium hexafluoride UF$_6$, at its upper end by means of a pipe b. Within column a is provided a diffusion chamber c constituted by a system of porous barriers and permitting the gas supplied to the interior of column a to partially pass through these barriers, where it is partly enriched, before collecting in the central region of chamber d in the form of a low pressure flow. That portion of the gas which has not passed through the barriers is collected in annular space e between the inner wall of column a and the outside of chamber c. This medium pressure flow is then taken up by a lateral pipe f which returns it to the upstream separation stage. Thus, this medium pressure flow circulates from one stage to the next in countercurrent relative to the high pressure flow supplied by the upper pipe b. At the lower end of separation chamber c is provided a heat-exchanger g traversed by the low pressure flow from said chamber. The low pressure flow is then collected in a tank h fitted at the base of column a by being suspended beneath the latter. The low pressure flow then passes through the centre of a diaphragm i into the body of a motorised compressor j, whilst the medium pressure flow from the downstream separation stage is supplied by pipe f to a first lateral opening l provided in tank h below diaphragm i. The medium and low pressure flows are then mixed in the motorised compressor and forced back by the latter into a diffuser n located in tank h below the intake opening l for the medium pressure flow. The high pressure flow passes out of the tank by a second lateral opening o and is taken up by a pipe p which feeds the gas into exchanger g where it exchanges the calories acquired through compression with the low pressure flow leaving separation chamber c. On leaving the exchanger the high pressure flow is finally fed into pipe b and passes through the latter to the following separation stage. This procedure is repeated in each of the stages of the separation installation.

Figure 2:
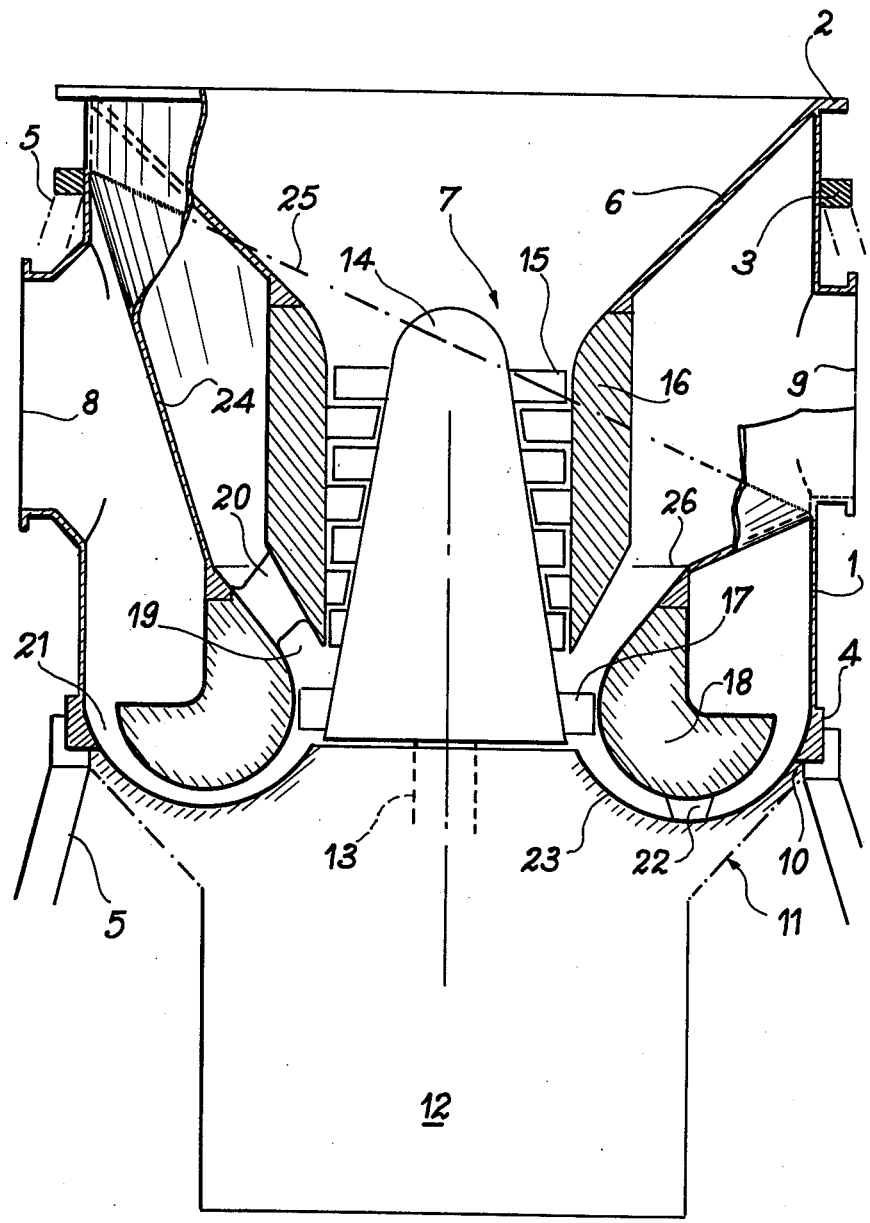
FIG. 2, a schematic sectional view along an axial and vertical plane of a first embodiment of the tank.

FIG. 2 illustrates on a larger scale the detail of the construction of the motorised compressor tank as defined hereinbefore suspended on the lower part of the column constituting a separation stage in the installation. The tank essentially comprises a cylindrical lateral ferrule 1 having a vertical axis and which can be fixed by means of a shoulder flange 2 provided in its upper part to the lower end (not shown) of the column. Ferrule 1 has other transverse shoulders 3 and 4 which in particular ensure the supporting of the tank and column by tie rods or supports, schematically indicated at 5, permitting the assembly to bear on a not shown plate.

At the top of and inside cylindrical ferrule 1 is provided a conical diaphragm 6 whose intake cross-section is advantageously level with or slightly below flange 2 which interconnects the tank and the column. The open central part of diaphragm 6 corresponds with the low pressure flow intake within the motorised compressor contained in the tank, said motorised compressor being schematically indicated in the drawing by the reference numeral 7. In ferrule 1 are provided two lateral openings 8, 9 which substantially face one another in diametrically opposite manner.

The motorised compressor 7 is entirely contained within ferrule 1 and is supported by a lateral flange 10 which is fixed to a base 11 which seals the tank. The motorised compressor has an electric motor 12 which via a shaft 13 drives an axial rotor 14 having two compression stages. In the first stage rotor 14 has a series of vanes 15 which are able to rotate with shaft 3 within a schematically shown stator 16 which itself has fixed blades (not shown). The second compression stage comprises a second row of vanes 17 fixed to rotor 14 and not shown blades fixed to a second stator illustrated by the reference numeral 18. The space between stators 16 and 18 defines an annular area permitting the admission into the motorised compressor of the medium pressure flow introduced into the tank through ferrule 1 by means of an entry opening 9. Webs or stiffeners 20 are located to the right of said annular area in order to stiffen stators 16 and 18.

The gas flow from the second compressor stage mixed with the flow from the first stage is then forced back into a high pressure diffuser 21 which comprises two annular channels separated by vanes 22, whereby one of these channels preferably constitutes an extension of stator 18, whilst the second channel 23 is constructed by means of an appropriately shaped metal sheet fixed to the base 11 of the tank.

According to the invention, the regions via which the medium pressure flow enters the tank and the high pressure flow leaves diffuser 21 are separated by a skirt 24 mounted in the tank and arranged in such a way that it has a truncated cone-shaped profile whose large base 25 is fixed, more particularly by welding, to the inner wall of ferrule 1 in accordance with a continuous connection line extending along an inclined plane on the motorised compressor shaft. Thus, line 25 passes below the entry opening 9 for the medium pressure flow and above the discharge opening 8 for the high pressure flow. The small base 26 of skirt 24, however, extends in a plane perpendicular to the rotor shaft being fixed to the upper end of stator 18 so that the skirt ensures a tight separation between the two flows. However, the sealing, particularly between stators 16 and 18 and intake diaphragm 6 and truncated cone-shaped skirt 24 respectively, can advantageously be supplemented by not-shown blowers or fans linking together the various members.

Due to the inclination of the skirt and its truncated cone-shape, the volumes at the medium pressure flow intake and the high pressure flow discharge, respectively inside and outside said skirt, have on the one hand a decreasing cross-section and on the other an increasing cross-section which is favourable for the aerodynamics of the system and the efficiency of the motorised compressor. Moreover, the arranging of the corresponding regions at the same level of the tank with the nesting of the respective volumes leads to a better distribution of the effects of the temperature differences and a more effective control of the differential expansions during operation.

Figure 3:
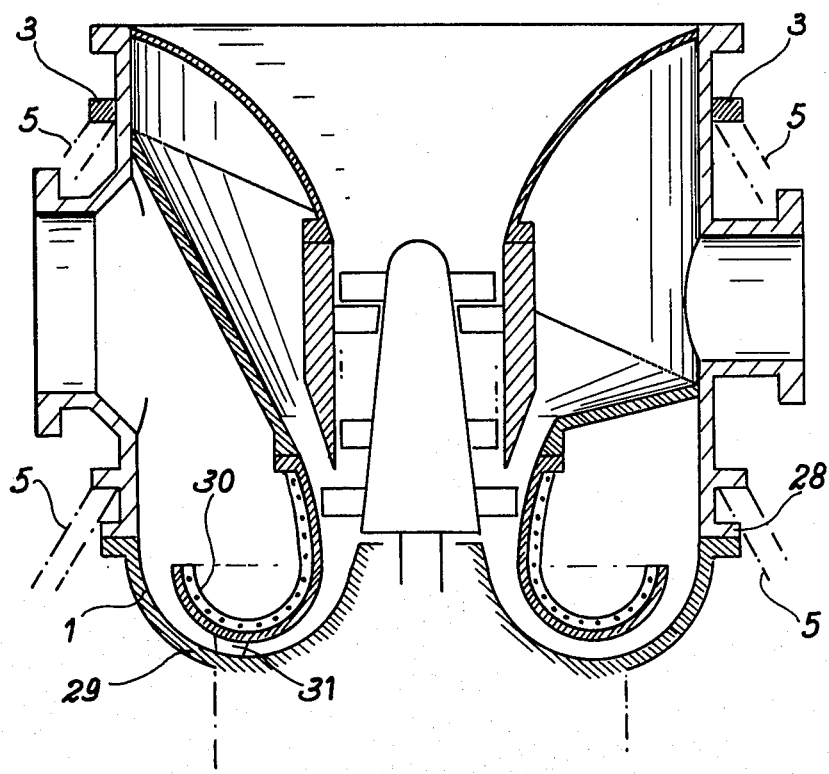
FIG. 3, a schematic sectional view along a vertical plane illustrating a variant.

According to a variant illustrated in FIG. 3, the lateral ferrule 1 is directly extended downwards by an annular half-channel 29 forming the outer wall of the high pressure diffuser 21. The inner part of diffuser 21 is constituted by another annular half-channel 30, preferably comprising adjacent bolted together sections, whereby the two channels 29 and 30 are fixed to one another by ribs 31 which also connect them to the base 11 of the tank. In this variant the connection between the base and the tank is transferred to the lowermost point which permits a better accessibility to the tank and facilitates its disassembly.

The invention is not limited to the embodiments described and represented hereinbefore, and various modifications can be made thereto without passing beyond the scope of the invention.

What is claimed is:

1. A tank for a motorized compressor having a generally cylindrical shape and a vertical axis, a motorized compressor in said tank, an axial intake for said compressor for a low pressure gas flow, a lateral intake for said compressor for a medium pressure flow to be mixed in the motorized compressor with the low pressure flow, an outlet for said motorized compressor, and a diffuser for forcing back the high pressure flow from said outlet, whereby said tank has a first lateral opening for the entry of the medium pressure flow and a second lateral opening substantially coaxial therewith for the discharge of the high pressure flow the improvement comprising means for separating the medium pressure flow before entering said motorized compressor and the high pressure flow at the outlet from said motorized compressor including a truncated cone-shaped skirt, a large base for said skirt inclined relative to said vertical axis, said skirt being fixed within said tank along a continuous line passing below said first lateral opening for the entry of the medium pressure flow and above said second lateral opening for the discharge of the high pressure flow.

2. A tank according to claim 1, including volumes defined on either side of said skirt in said tank, said volumes having an increasing cross-section towards said discharge opening for the high pressure flow and a decreasing cross-section starting from said intake opening for the medium pressure flow.

3. A tank according to claim 1, said skirt having a small base extending in a plane perpendicular to said vertical axis.

4. A tank according to claim 1, said diffuser for the high pressure flow including a channel fixed to a base, said base sealing a lower part of said tank.

5. A tank according to claim 4, said channel being a plurality of adjacent joined sections.

* * * * *